United States Patent [19]

Jensen

[11] Patent Number: 4,512,458
[45] Date of Patent: Apr. 23, 1985

[54] BRIDGE SCRAPER FOR DIRECT MATERIAL FEEDING

[75] Inventor: Torkil D. Jensen, Copenhagen, Denmark

[73] Assignee: F. L. Smidth & Co. A/S, Denmark

[21] Appl. No.: 448,427

[22] Filed: Dec. 10, 1982

[30] Foreign Application Priority Data

Dec. 15, 1981 [DE] Fed. Rep. of Germany ....... 3149650

[51] Int. Cl.$^3$ .............................................. B65G 43/00
[52] U.S. Cl. ..................................... 198/507; 198/505; 198/519
[58] Field of Search ....................... 198/507, 505, 519; 414/133

[56] References Cited

U.S. PATENT DOCUMENTS

| | | | |
|---|---|---|---|
| 3,108,700 | 10/1963 | Swindells et al. | 198/519 |
| 4,248,337 | 2/1981 | Zimmer | 198/507 |
| 4,264,256 | 4/1981 | Berthold | 198/519 |

Primary Examiner—Joseph E. Valenza
Assistant Examiner—Kyle E. Shane
Attorney, Agent, or Firm—Brumbaugh, Graves, Donohue & Raymond

[57] ABSTRACT

The invention relates to a bridge scraper for raking material from a storage heap onto a belt conveyor by means of a scraper chain mounted on a bridge which also carries a carriage which feeds material from the heap to the scraper chain. The speed of the conveyor and that of the bridge, the scraper chain and the carriage is controlled by means of a bolt weigher at the outlet end of the belt conveyor which controls the speed of the belt and consequently that of the other elements of the bridge scraper so as to discharge a constant amount of material per unit time. A further measuring device is mounted on the bridge for travel with it so as to measure continuously the degree of filling of the belt at a point immediately after that at which it receives material from the scraper chain and the measuring device controls the relationship between the speed of the bridge and that of the scraper chain, carriage and belt conveyor to increase the relative travelling speed of the bridge when the belt filling rate drops below a predetermined value and to decrease it when the belt filling rate exceeds that predetermined value.

2 Claims, 1 Drawing Figure

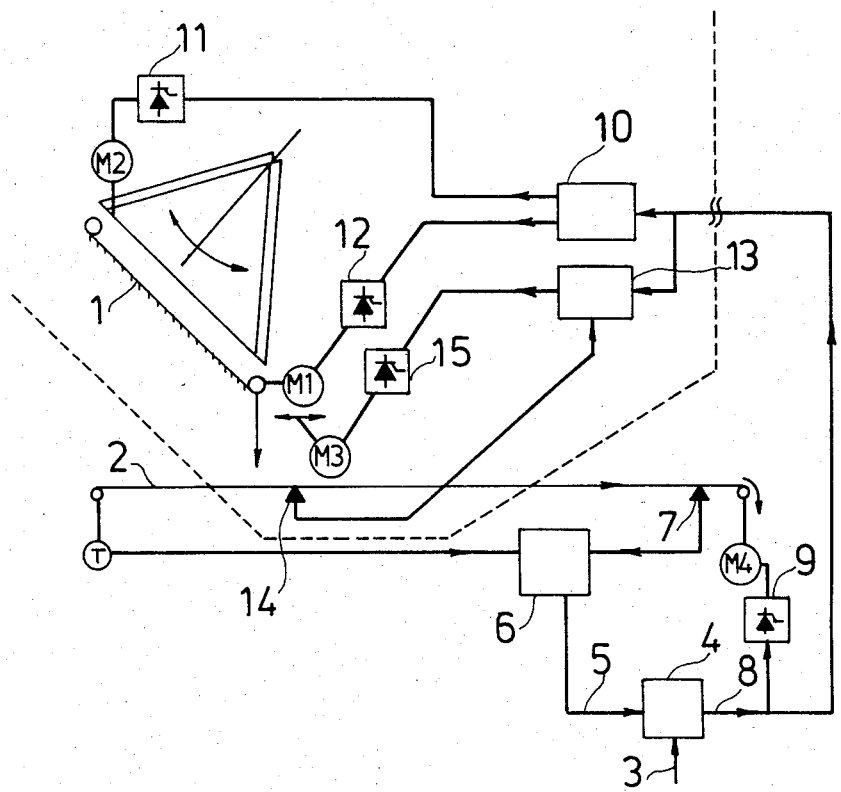

BRIDGE SCRAPER FOR DIRECT MATERIAL FEEDING

The invention relates to a bridge scraper for raking material from a storage heap.

A known scraper has a raking device positioned at one end face of the heap and mounted on a carriage on a bridge perpendicular to the centre line of the storage heap. By means of a drive unit the device is capable of travelling into the storage heap and of moving to and fro along the base line of the triangular end face of the heap. Material raked down, by a scraper chain extending parallel to the bridge, is placed on a belt conveyor alongside the storage heap, the travelling speed of the conveyor being coupled with that of the bridge drive unit, the scraper chain and the carriage, and the conveyor at its outlet end being provided with a belt weigher which controls the speed of the belt and consequently that of the remaining equipment of the bridge scraper so as to discharge a constant amount of material per unit time.

From a theoretical point of view bridge scrapers of the above kind are particularly suited for achieving constant material discharge, as the raking device, at constant carriage speed covers equally large areas per unit time, provided its top part keeps passing through a point at the apex of the end face.

In practice, however, the material is not passed along the raking device, but trickles down along the heap end face perpendicularly to the heap base line. Material trickled down is excavated by a plough mounted on the carriage, and the excavated amount of material, and consequently the degree of filling of the scraper chain, are thus largest when the carriage travels near the middle of the heap. Further variations in the degree of filling of the scraper chain derive from the fact that the carriage travels at one time in the same direction as the scraper chain and then at a different time in the opposite direction.

It has, however, turned out that the uneven filling of the scraper chain is evened out when the carriage speed is high as compared with the speed of the scraper chain. In pratice, satisfactorily even filling of the scraper chain is obtained when the carriage speed is 3.8 times that of the scraper chain.

The scraper chain discharges material onto the belt in heaps, but if the belt speed is sufficiently low as compared with the chain speed the heaps overlap each other and constitute a comparatively even filling of the belt.

With a view to obtaining constant material discharge from the belt to e.g. a mill, it is known to control the belt speed by a belt weigher which is provided at the outlet end of the belt and controls the belt speed in such a way that a constant quantity of material is discharged per unit time. This means that the speed of the remaining driving units of the bridge scraper is controlled, as the speed of the scraper chain must be in a certain relationship to that of the belt to obtain an evening out of the heaps discharged; the carriage speed must preserve the relationship described to the scraper chain speed, and finally the speed with which the bridge travels into the material heap is coupled to the other speeds in such a way that a certain percentage alteration of these speeds causes the same percentage alteration of the set speed of attack.

Such a bridge scraper with coupled travelling speeds can be used in case of a full storage heap with a constant cross-section, but not when the cross-section of the storage heap varies, which e.g. is the case when attacking a heap or when raking the rear end cone of the heap. When the heap cross-section for example decreases, the carriage for part of its travelling time travels away from the heap so that the degree of filling of the scraper chain becomes uneven and imperfect. If, by suitable control, the distance covered by the carriage is shortened to the effect that the carriage remains within the heap, the distance covered after each swing of the raking device gets shorter, and the distance which the bridge moves into the heap per swing gets correspondingly shorter; also the peeled off material layer gets thinner, which eventually causes impaired filling of the scraper chain and the belt. When the part of the belt which is only partly filled reaches the belt weigher it causes a stepping up of the belt speed and consequently of the remaining speeds without this changing the fact that the peeled off material layer is too thin. The filling of the belt may thus vary within a wide range.

The speed of the belt motor may with nominal filling of the belt and nominal production suitably be fixed at 80 percent of its maximum speed so that the belt speed, and consequently the speeds coupled thereto, can only be increased by approx. 20 percent above their speeds at nominal production.

As a large part of the material lies in the end cones of the heaps it is the object of the invention to devise a bridge scraper which, irrespective of greatly varying heap cross-section, is capable of providing a constant material discharge.

According to the invention a bridge scraper for raking material from a storage heap, the scraper having a raking device positioned at one end face of the heap, the device being mounted on a carriage on a bridge perpendicular to the centre line of the storage heap and being moved into the storage heap and to and fro along the base line of the end face, of the heap by means of a drive unit; a scraper chain extending parallel to the bridge, for raking material onto a belt conveyor, the speed of the conveyor being coupled with that of the bridge drive unit, the scraper chain and the carriage; and a belt weigher at the outlet and of the conveyor which controls the speed of the belt and consequently that of the other elements of the bridge scraper so as to discharge a constant amount of material per unit time, is characterized in that on the bridge and travelling with it is mounted a measuring device which measures continuously the degree of filling of the belt immediately after the point at which it receives the material from the scraper chain, a signal from the measuring device controlling the relationship between the speed of the bridge and that of the scraper chain, carriage and belt conveyor so that the relative travelling speed of the bridge increases when the belt filling rate drops below a set value, and decreases when the belt filling rate exceeds the set value.

The measuring device travelling with the bridge is typically a belt weigher, but may, however, be of any other known kind, for example acting by gamma rays or by sensors.

One example of the invention will now be described with reference to the accompanying drawing which shows diagrammatically a bridge scraper with appertaining control devices and provides a signal flow diagram of the scraper.

M1 is a motor driving scraper chain 1. M2 is a motor driving a reciprocating carriage, while M3 is a motor for moving a bridge into a storage heap, on which bridge the scraper chain 1 is mounted. M4 is a motor driving a belt 2 which extends along the storage heap and onto which belt the scraper chain 1 discharges raked-down material.

The desired production rate is set by a setting value on an input line 3 and, the set value is compared in a computer unit 4 with a value for the actual production on an input line 5. This value results from constantly multiplying the actual speed of the belt 2 with the actual filling of the belt at its outlet in a computer unit 6. The actual belt speed is measured by a tachogenerator T, from which a signal is passed to the computer unit 6, while the filling of the belt at its outlet is measured by a belt weigher 7, from which a signal is also passed to the computer unit 6.

From the unit 4 a signal is constantly sent out on an output line 8 to control the speed of the motor M4 via a thyristor control 9. When the actual production deviates from the one desired, the unit 4 alters the signal on the output line 8 so that the speed of the motor M4 is altered so as to counteract the deviation.

The signal on the output line 8 is also used to control the motors M1, M2 and M3 so that each of them at all times holds a speed which is in a preset relation to that of the motor M4. In the case of the carriage motor M2 and the scraper chain motor M1 these relations are set in a control unit 10 mounted on the bridge so as to travel with it. This control unit 10 receives signals from the output line 8 and sends control signals to a thyristor control 11 for the carriage motor M2 and to a thyristor control 12 for the scraper chain motor M1. To control the speed of the bridge drive motor M3 a further control unit 13 receives signals from the output line 8 and from a belt weigher 14 which constantly measures the filling of the belt 2 at a point immediately after the point at which the belt receives material from the scraper chain 1.

In the control unit 13 the desired filling rate of the belt can be set, and the control unit 13 then takes care that the relationship between the speeds of the belt motor M4 and the bridge drive motor M3 is controlled to obtain the desired filling.

When the filling rate measured by the belt weigher 14 deviates from the one desired, the signal received from the belt weigher will cause the control unit 13 to alter the relation between the bridge travel speed and the other speeds in such a way that the bridge travels into the heap with a speed which is relatively increasing if the belt filling rate drops below the one desired, and, conversely, relatively decreasing if the belt filling rate exceeds that desired.

By this regulation of the relationship between the travel speed of the bridge and that of the other movable parts of the bridge scraper there is achieved partly a constant filling rate of the belt 2, and partly a moderate level of the speed of the belt 2, the scraper chain 1 and the carriage even when the heap width is small, which will be the case when travelling into the end cones of a new heap, or in the cases where both height and width of the heap is reduced, which is the case when raking the rear end cone of the heap, since, when increasing the speed of attack of the bridge, relatively a thicker material layer is raked down per swing of the raking device whereby there is compensated for the smaller heap cross-section.

The measuring device travelling with the bridge for measuring the filling of the belt 2 is mentioned as a belt weigher, but may of course be any kind of measuring device for measuring the filling of the belt, without this affecting the scope of the invention.

Elements shown in the drawing above the dotted line are mounted on the bridge.

I claim:

1. A bridge scraper for raking material from a storage heap, said bridge scraper comprising a raking device positioned at one end face of the heap, the raking device being mounted on a carriage on a bridge perpendicular to the center line of the storage heap and being moved into the storage heap and to and fro along the base line of the end face of the heap by means of a drive unit; a scraper chain extending parallel to the bridge for raking material onto a belt conveyor, the speed of the conveyor being coupled through control lines with that of the bridge drive unit, the scraper chain and the carriage; a first measuring device and a second measuring device, said first measuring device comprising a belt weigher located near the outlet end of the belt conveyor and adapted to control the speed of said belt conveyor so as to cause a substantially constant amount of material to be discharged from said outlet end per unit of time, said second measuring device comprising a measuring device located and adapted to measure the filling of the belt immediately after the point at which it receives the material from the scraper chain and being further adapted to control the relation between the speed of the bridge and the speed of the scraper chain, carriage and belt conveyor in such a way that the relative travelling speed of the bridge increases when the belt filling rate drops below a set value and decreases when the belt filling rate exceeds the set value.

2. A scraper according to claim 1 wherein said second measuring device is a belt weigher.

* * * * *